United States Patent [19]
Clise et al.

[11] Patent Number: 6,064,722
[45] Date of Patent: May 16, 2000

[54] DATA REQUEST ROUTER FOR USE WITH EMERGENCY PUBLIC SAFETY ANSWERING POINT SYSTEMS

[75] Inventors: William E. Clise; Michael Crowson, both of Seattle; Sunit Lothia, Redmond, all of Wash.

[73] Assignee: XYPOINT Corporation, Seattle, Wash.

[21] Appl. No.: 08/783,478

[22] Filed: Jan. 14, 1997

[51] Int. Cl.[7] .......................... H04M 11/04; H04M 7/00; H04M 3/00; H04H 7/00

[52] U.S. Cl. .......................... 379/37; 379/221; 379/279; 455/404

[58] Field of Search ............................. 379/91.02, 93.14, 379/93.23, 93.25, 93.34, 142, 127, 245–246, 45, 221, 279; 455/414, 415, 456–457, 404; 707/201, 204; 395/200.36, 200.37, 200.69–200.7

[56] References Cited

U.S. PATENT DOCUMENTS

| | | |
|---|---|---|
| 1,103,073 | 7/1914 | O'Connell . |
| 3,881,060 | 4/1975 | Connell et al. ............................. 179/5.5 |
| 5,043,736 | 8/1991 | Darnell et al. ............................. 342/357 |
| 5,081,667 | 1/1992 | Drori et al. ................................. 379/59 |
| 5,109,399 | 4/1992 | Thompson ................................. 379/45 |
| 5,161,180 | 11/1992 | Chavous ..................................... 379/45 |
| 5,235,630 | 8/1993 | Moody et al. .............................. 379/37 |
| 5,239,570 | 8/1993 | Koster et al. ............................... 379/45 |
| 5,249,223 | 9/1993 | Vanacore ..................................... 379/45 |
| 5,347,567 | 9/1994 | Moody et al. .............................. 379/45 |
| 5,347,568 | 9/1994 | Moody et al. .............................. 379/45 |
| 5,388,147 | 2/1995 | Grimes ....................................... 379/59 |
| 5,461,390 | 10/1995 | Hoshen ..................................... 342/419 |
| 5,479,482 | 12/1995 | Grimes ....................................... 379/37 |
| 5,508,707 | 4/1996 | LeBlanc et al. .......................... 342/457 |
| 5,555,286 | 9/1996 | Tendler ....................................... 379/59 |
| 5,761,278 | 6/1998 | Pickett et al. .......................... 379/90.01 |

FOREIGN PATENT DOCUMENTS

WO90/13196  11/1990  WIPO ............................. H04M 1/72

*Primary Examiner*—Curtis A. Kuntz
*Assistant Examiner*—George Eng
*Attorney, Agent, or Firm*—Knobbe, Martens, Olson & Bear LLP

[57] ABSTRACT

A data request router for use with a public safety answering point (PSAP) system. The router receives a data request from the PSAP system and transmits the data request to a primary database and an alternate information sources. The router is capable of determining whether the primary database is able to provide the data requested by the PSAP system. If the router determines that the primary database is unable to provide the data requested, it receives a reply from the alternate information source and transmits the data contained in the reply from the alternate information source to the PSAP system. In one aspect, the router includes a switch designed to directly connect the PSAP system to the primary database when the router becomes inoperative either due to a failure or loss of power. In another aspect, the router transmits the data request received from the PSAP system to the primary database and determines that the primary database is unable to provide the data requested when a reply from the primary database does not contain the data requested. In another aspect of the invention, the router determines that the primary database is unable to provide the data requested by the PSAP system by analyzing the data request received from the PSAP system.

58 Claims, 8 Drawing Sheets

DATA REQUEST ROUTER FOR USE WITH EMERGENCY PUBLIC SAFETY ANSWERING POINT SYSTEMS

TECHNICAL FIELD

This invention relates to emergency public safety answering point systems, and more particularly, to a router for routing data request messages to various information sources.

BACKGROUND OF THE INVENTION

The introduction of a public safety answering point (PSAP) system has greatly assisted providers of emergency services such as fire, police, and rescue departments. Briefly described, a local switching system receives a call from a calling party requiring emergency assistance and transmits the telephone number of the calling party to the PSAP system. In response, the PSAP system accesses an automatic location identification (ALI) database containing information associated with the calling telephone number and obtains the name and billing address of the calling telephone user from the ALI database. As can be appreciated, the address information may be very important since the calling party may be in a state of panic and is often incapable of supplying the location information to an emergency service operator in a timely manner. Thus, the address information obtained by the PSAP system allows the emergency service provider to more quickly respond to the emergency situation.

The ALI database is typically maintained by the local exchange carrier (LEC). Often, however, the ALI database cannot provide the necessary information for those telephones that are not controlled by the local exchange carrier. For example, the ALI database does not carry any information for private branch exchange (PBX) telephones and wireless telephones such as cellular telephones.

It is therefore desirable to provide a system and method for providing the necessary data requested by the PSAP system using an alternate information source other than the ALI database maintained by the local exchange carrier. It is also desirable to provide such a system and method with little or no modification to the existing PSAP system to provide a cost effective solution. The present invention provides these and other advantages, as will be illustrated by the following description and accompanying figures. In the figures, like reference numerals indicate similar components.

SUMMARY OF THE INVENTION

According to the principles of the present invention, a data request router for use with a public safety answering point (PSAP) system is provided. The router includes an I/O circuit which is in communication with the PSAP system, a primary database system, which may be maintained by a local exchange carrier, and an alternate information source, which may be maintained by an alternate carrier or a private organization. The data request router also includes a processor connected to the I/O circuit. The processor receives a data request from the PSAP system through the I/O circuit and is capable of transmitting the data request to the primary database system and alternate information source. The processor is also capable of determining whether the primary database system is able to provide the data requested by the PSAP system. If it is determined that the primary database system is unable to provide the requested data, the processor obtains the data from the alternate information source and transmits that data to the PSAP system.

In one aspect of the invention, the data request router includes a switch connected to the I/O circuit. The switch is designed to connect a communication link from the PSAP system to a communication link from the primary database system when the processor becomes inoperative either due to a failure or loss of power. The switch ensures that the PSAP system is able to communicate with the primary database system at all times.

In another aspect of the invention, the processor transmits the data request from the PSAP system to the primary database system and determines that the primary database system is unable to provide the data requested when a reply from the primary database system does not contain the data. In another aspect of the invention, the processor determines that the primary database system is unable to provide the data requested by the PSAP system by analyzing the information contained in the data request from the PSAP system.

DETAILED DESCRIPTION OF THE INVENTION

Figure 1:
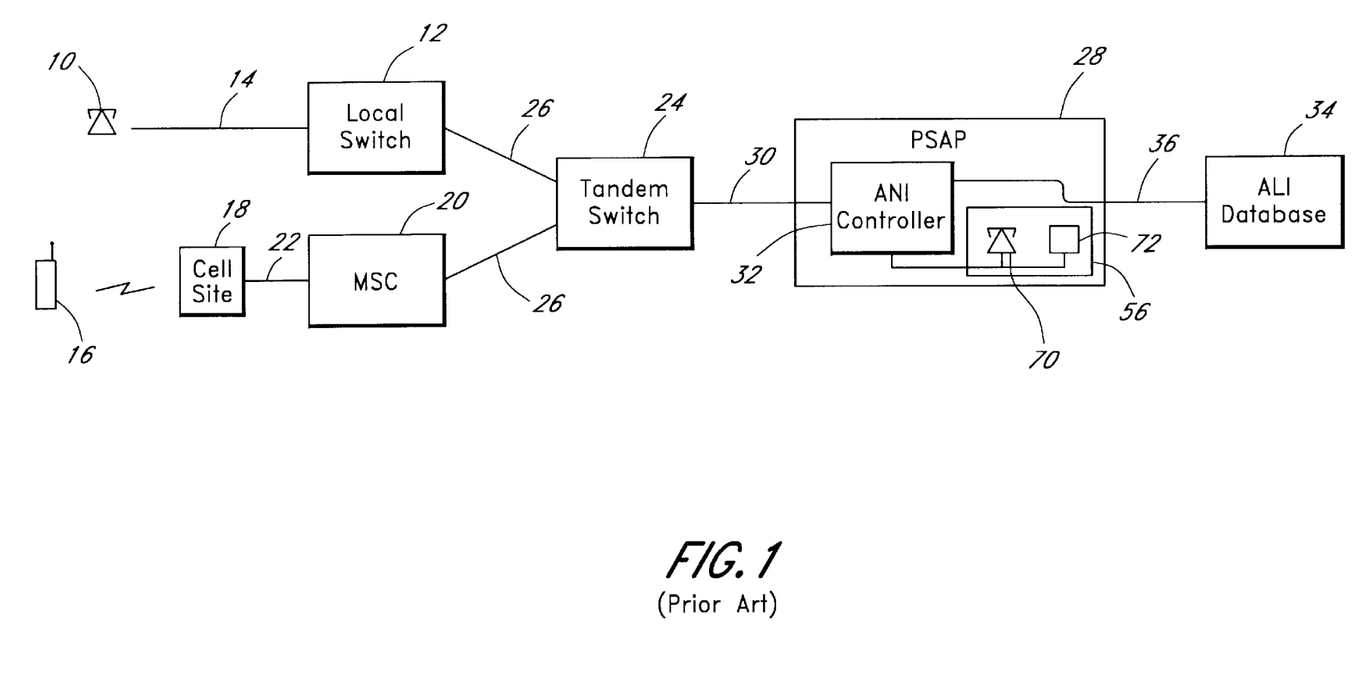
FIG. 1 is a public emergency call service system according to the prior art.

A public emergency call service system according to the prior art is illustrated in FIG. 1. A wired telephone 10 is connected to a local switching system 12 through a telephone line 14. The local switching system 12 may be, for example, AT&T's 1/1AESS™ or 5ESS™ switch, PBX, or any other type of switch capable of switching telephone calls. A cellular telephone 16 communicates with a cell site 18 through radio frequency transceivers (not shown) located at the cell site. The cell site 18 is connected to a cellular switching system 20 such as a mobile switching center (MSC), which is also known as a mobile telecommunications switching office (MTSO), through trunk lines 22. As is well known in the art, the MSC 20 typically connects multiple cell sites 18 over the trunk lines 22. The local switching system 12 and the MSC 20 are connected to a E911 tandem switching system 24 through trunk lines 26. The tandem switching system 24 may be either a local switching system being used as a tandem switch such as 1/1AESS™ or a trunks-only tandem switching system.

While the word "connected" is used throughout the specification for clarity, it is intended to have the same meaning as "coupled." Accordingly, "connected" should be interpreted as meaning either a direct connection or an indirect connection. For example, the wired telephone 10 may be directly connected to the local switching system 12 or indirectly connected to the local switching system 12 through a PBX.

In operation, when the wired telephone 10 makes an emergency call through the telephone line 14, the local switching system 12 switches the call to the tandem switching system 24 through one of the trunk lines 26. When the cellular telephone 16 makes an emergency call, the cell site 18 connects the call to the MSC 20 through one of the trunk lines 22. The MSC 20 in turn switches the call to the tandem switching system 24 through one of the trunk lines 26. For an emergency call such as a 911 call, the local switching system 12 is programmed to transmit automatic number identification (ANI) information to the tandem switching system 24. The ANI information includes the calling telephone number of the telephone 10 making the emergency call which is typically in the form of a billing telephone number. It is to be understood, however, that while the 911 number is the most common emergency number, various government agencies have set up other emergency telephone numbers. For those calls, the local switching system 12 is also programmed to transmit automatic number identification (ANI) information to the tandem switching system 24.

For an emergency call from the cellular telephone 16, the MSC 20 may transmit an identification of the trunk group 22 or the cell site 18 from which the call is received, or an actual calling telephone number of the cellular telephone 16.

The tandem switching system 24 communicates with a public safety answering point (PSAP) system 28 through trunk lines 30. The trunk lines 30 are typically CAMA (Centralized Automatic Message Accounting) trunks that use MF (multifrequency) inband signaling using I+7 digits format. The PSAP system 28 is well known in the art and includes a plurality of operator positions (one shown) 56 for answering the emergency calls and an ANI controller 32 connected to the tandem switching system 24 through the trunk lines 30. The operator positions 56 are also connected to the ANI controller 32 and each position includes a telephone 70 for answering the emergency calls and a display terminal 72 for displaying data information associated with the call.

In operation, the tandem switching system 24 connects the emergency call to the PSAP system 28 through one of the trunk lines 30 and transmits to the ANI controller 32 the calling telephone number or whatever information is received over the trunks 26. The ANI controller 32 assigns the call to one of the operator positions 56, formulates a data request message containing the calling telephone number, and transmits the data request message to an automatic location information (ALI) database 34 through a communication link 36. Generally, the ALI database system 34 is located at the local exchange carrier's premise and is remote from the tandem switching system 24 and the PSAP system 28. The ALI database system 34, typically owned and operated by the local exchange carrier, maintains a database containing information associated with telephone numbers. The associated information includes such items as the name and the address of the calling telephone number's subscriber and the telephone numbers of the subscriber's local police, fire, and ambulance departments. The associated information may also include the subscriber's personal medical data. The ALI database system 34 receives the data request message from the PSAP system 28, retrieves the information requested, formats the retrieved information into a reply message, and transmits the reply message to the PSAP system 28 through the communication link 36. The ANI controller 32 in the PSAP system 28 receives the reply message and displays the data in the display terminal 72 of the operator position 56 that has been assigned to handle the emergency call.

Often, however, the ALI database cannot provide the associated information for those telephones that are not controlled by the local exchange carrier. For example, the ALI database does not carry any information for wireless telephones such as cellular telephones 16 and private branch exchange (PBX) telephones (not shown). Thus, when the data request message from the PSAP system 28 contains the telephone number of the cellular telephone 16, for example, the ALI database system 34 is unable to provide the associated information requested by the PSAP system 28 and transmits a reply message indicating that no record has been found.

Figure 2:
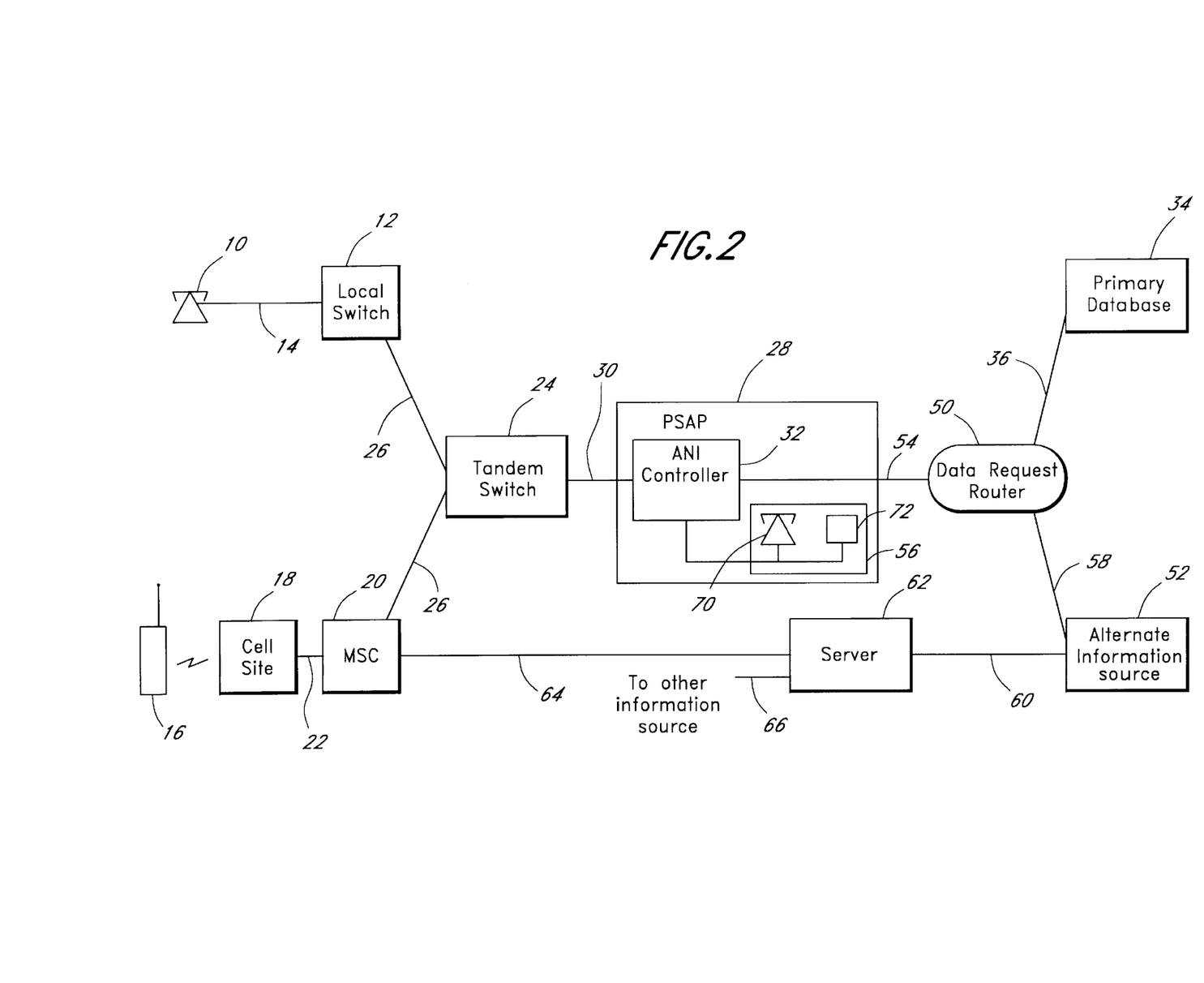
FIG. 2 is a public emergency call service system according to the present invention.

A public emergency call service system according to the present invention is illustrated in FIG. 2. A data request router 50 of the present invention is positioned between the PSAP system 28 and the primary database system 34 through communication links 54 and 36, respectively. The primary database system 34 is identical to the ALI database system of FIG. 1 and is typically maintained by the local exchange carrier (LEC), or an alternate LEC providing local telephone service. In some cases, the primary database system 34 is maintained by a local government agency. The data request router 50 is also connected to at least one alternate information source 52 through a communication link 58. The alternate information source 52 may be implemented using any computer system such as a personal computer and is capable of storing information associated with telephone numbers or is capable of receiving the associated information from other alternate information databases. The alternate information source 52 is typically maintained by a private information collector or an alternate carrier such as a cellular service provider or PBX operator, and contains similar types of information as the primary database system 34.

In the embodiment shown, the alternate information source 52 is connected to a server computer 62 through a high speed data link 60. The server computer 62 may be connected to other data request routers (not shown) either directly or indirectly to handle multiple PSAP systems. The server computer 62 is also connected to the MSC 20 and other MSCs (not shown) through a data link 64 such as an SS7 (Signalling System 7) link, X.25 link, or the like. The MSC 20 is programmed to send information associated with the cellular telephone 16 making the emergency call over the data link 64. The associated information includes the cell site information and the telephone number of the cellular telephone 16 making the emergency call. The server computer 62 receives the associated information and translates the cell site information into an English description of its geographic location such as an address or an address range. In one embodiment, the server computer 62 receives through the MSC 20 a GPS (Global Positioning System) information of the cellular telephone 16 making the emergency call. In this embodiment, the server computer 62 translates the GPS information into an exact geographic location of the cellular telephone 16. One system of obtaining the GPS information is described in U.S. Pat. No. 5,388,147 issued to Grimes on Feb. 7, 1995, which is incorporated herein by reference. The translated information is then sent to the alternate information source 52 over the link 60. The server computer 62 may also be connected to other information source (not shown)

through data links 66 which may have additional information associated with the emergency telephone call such as the subscriber's name and personal medical data. While the server computer 62 is shown as connected between the alternate information source 52 and the MSC 20, it is to be understood that the present invention may be implemented without the server computer. For example, the alternate information source 52 may be directly connected to the MSC 20 and the location translation process is performed by the alternate information source 52. Preferably, either the server computer 62 or the alternate information source 52 includes an alternate database (not shown) containing the associated information for at least some of the telephones that are not controlled by the primary LEC.

For clarity, FIG. 2 is described using a cellular telephone system environment. However, persons of ordinary skill in the art will appreciate that the techniques described herein may be used with any telephone switching systems including a private branch exchange (PBX), personal communications services (PCS) systems, alternate LECs and the like. Preferably, the data request router 50 is designed to work with the existing PSAP 28 and primary database systems 34, and requires minimum or no modification to provide a cost-effective system of providing the emergency call location information.

Figure 3A:
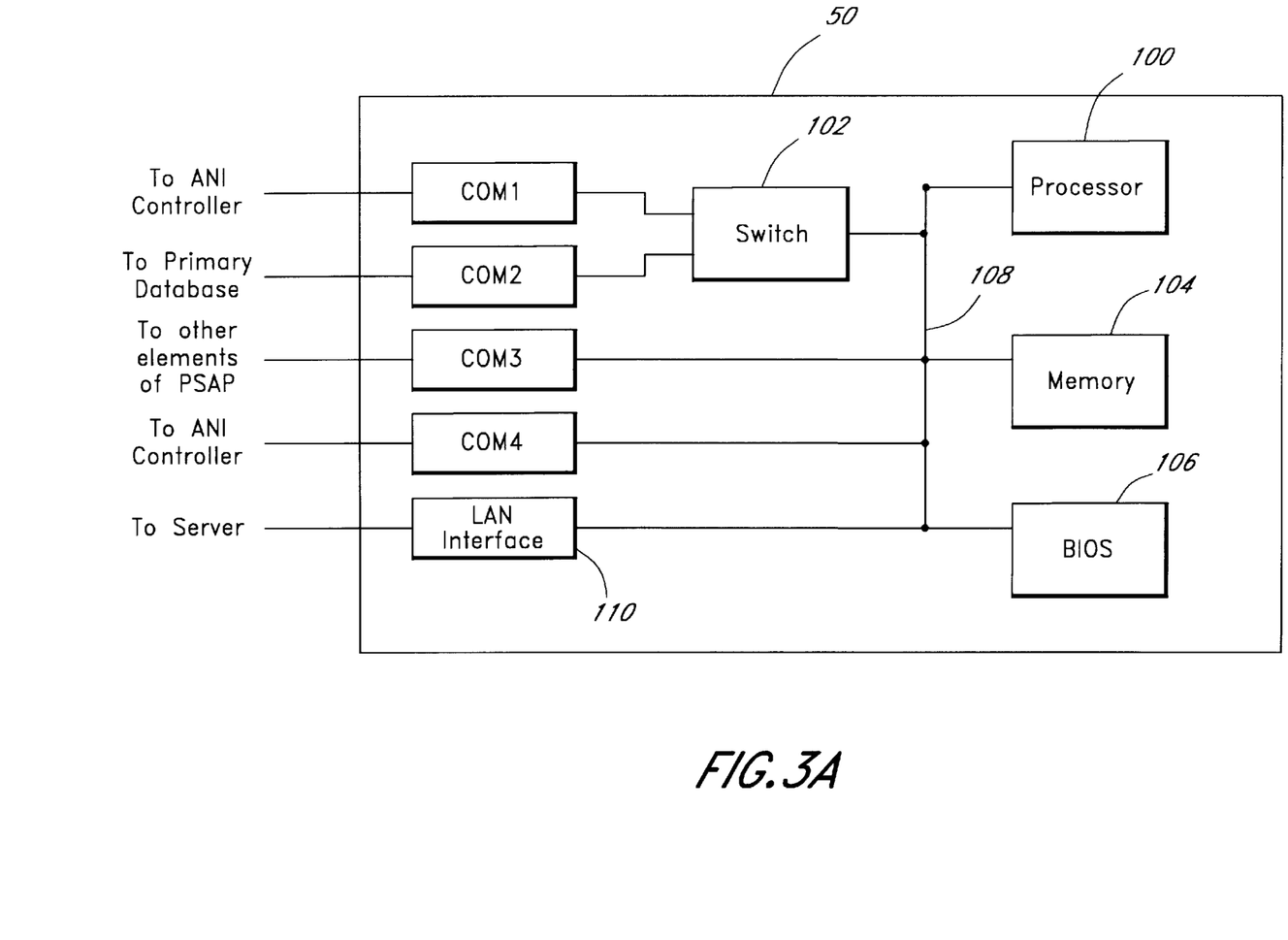
FIG. 3A is a functional block diagram of a data request router according to the present invention.

According to the present invention, the data request router 50 is capable of determining whether the primary database system 34 is able to provide the data requested by the PSAP system 28. If it is determined that the primary database system 34 is unable to provide the requested data, the data request router 50 obtains the data from the alternate information source 52 and transmits that data to the PSAP system 28 for display at the display terminal 72. A detailed operation of the data request router 50 will now be explained with reference to FIG. 3 which illustrates a functional block diagram of the router 50.

An I/O circuit of the router 50 includes I/O communication port interfaces COM1–COM4 and a local area network (LAN) I/O interface 110, all of which are connected to a processor 100 through a control and data bus 108. The I/O interfaces COM1-COM2 are respectively connected to the PSAP system 28 and the primary database system 34. Typically, the I/O interface COM1 communicates with the ANI controller 32 of the PSAP system 28 over the data link 54 using a NENA (National Emergency Number Association) standard protocol at a typical speed of 1200 or 9600 baud rates. The I/O interface COM2 also communicates with the primary database system 34 over the data link 36 at 1200 or 9600 baud rate through a modem (not shown). The data request messages from the PSAP system 28 are transmitted to the primary database system 34 in exactly the same format. The I/O interface COM2 also receives reply messages from the primary database system 34.

The I/O interfaces COM1-COM2 are connected to the processor 100 through a switch 102. The switch 102 is capable of connecting the COM1 interface to COM2 interface when the processor 100 is rendered inoperative. In the embodiment shown, the transmit and receive sides of the COM1 interface are respectively connected to the receive and transmit sides of the COM2 interface. The processor 100 may be rendered inoperative when it is taken out of service for maintenance and update of software, the processor loses power, or the processor simply fails due to hardware or software error. The switch 102 may be closed automatically or manually by a human operator. One example of the switch 102 is a mechanical or electronic relay that automatically closes upon loss of power. The switch 102 ensures that the PSAP system 28 is able to communicate with the primary database system 34 at all times.

The I/O interface COM3 is designed to connect to other network elements of the PSAP system 28 such as the display terminal 72 for transmitting such data as a map of the location.

While the ANI controller 32 transmits data request messages for most emergency calls over the data link 54 to the I/O interface COM1, some ANI controllers have the capability to transmit data request messages for non-primary LEC emergency calls over a separate data link (not shown) based on the trunk group 30 through which the calls are received. The I/O interface COM4 is designed to communicate with the ANI controller 32 over that separate data link. The non-primary LEC emergency calls may include calls from PBXs, MSCs, PCSs and alternate LEC providing local telephone service.

The LAN I/O interface 110 is designed to communicate with the alternate information source 52 through the communication link 58. Preferably, the communication link 58 is a high speed data link such as a frame relay link.

The processor 100 is connected to a memory 104 and a basic input/output system (BIOS) 106 through the control and data bus 108. The memory 104 stores data request routing routines of FIGS. 4A–4C and 5, and is used to store data requests and reply messages from the PSAP system 28, primary database system 34 and alternate information source 52. The BIOS 106 stores initialization routines and is used to initialize the I/O interfaces COM1–COM4, and LAN I/O interface 110. The processor 100 may be a microprocessor, embedded processor, central processing unit, or the like. The processor 100 controls all interfaces COM1–COM4, LAN interface 110 and the switch 102. The processor receives data request messages from the ANI controller 32 and transmits reply messages to the ANI controller through the I/O interface COM1 in the required format. The processor 100 is also capable of interfacing with different ANI controller types that have different speed and data formats.

Figure 3B:
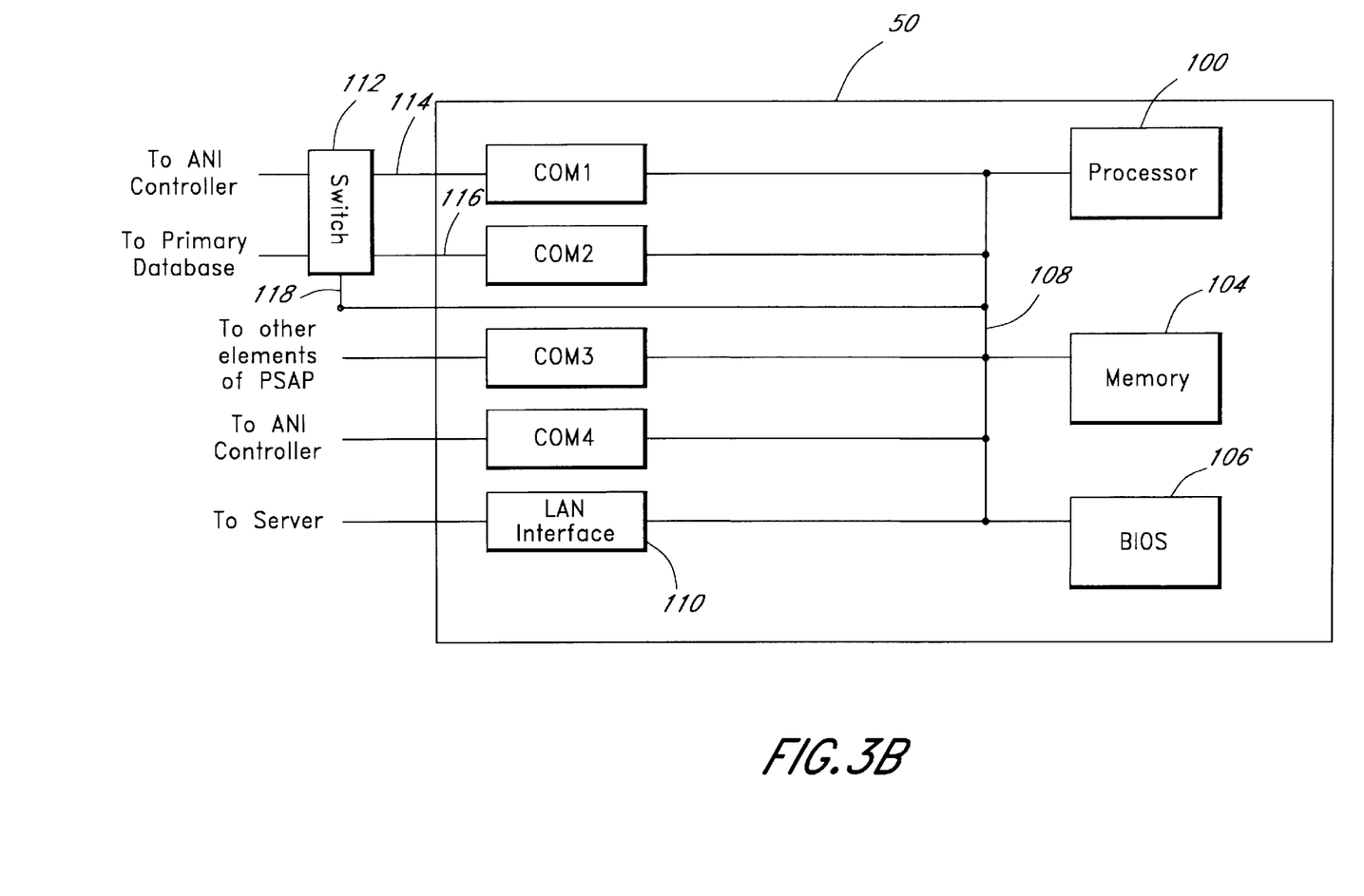
FIG. 3B is an alternative embodiment of the data request router according to the present invention.

FIG. 3B illustrates an alternative embodiment of implementing the switch 102 of FIG. 3A. A switch 112 is located outside of the router 50. The switch 112 connects the data links 54 and 36 to the I/O interfaces COM1 and COM2 through data lines 114 and 116, respectively. The processor 100 controls the switch 112 through the control and data bus 108 which is connected to a control input 118 of the switch. Similar to the switch 102 of FIG. 3A, the switch 112 connects the data links 114 and 116 to each other under the control of the processor 100. The switch, however, may also be manually operated. The externally located switch 112 ensures that the PSAP system can communicate with the primary database system 34 even when the router 50 is physically removed for service.

Figure 4A:
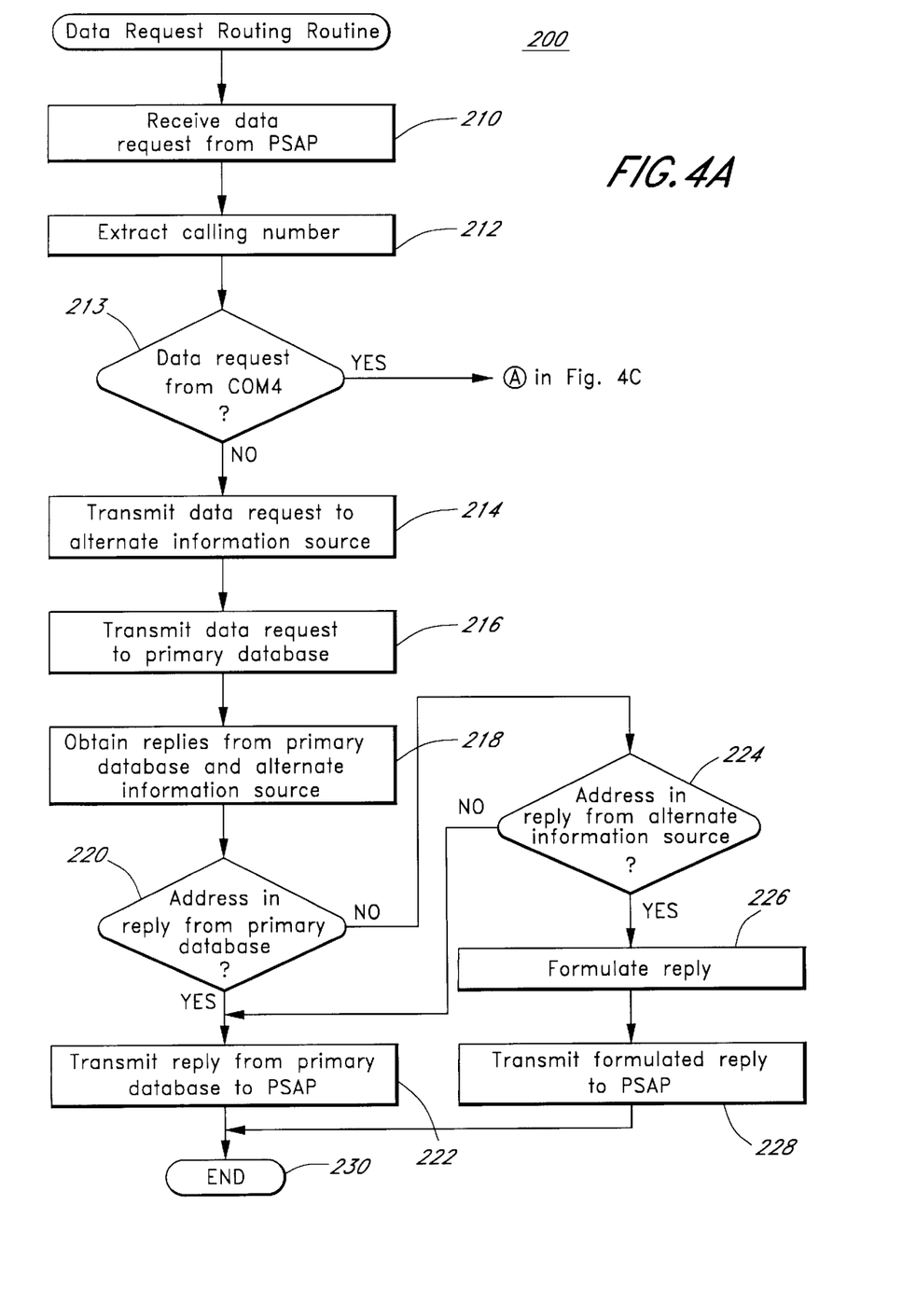
FIG. 4A is a flowchart for a method of routing a data request from the PSAP system according to the present invention.

A detailed operation of the processor 100 will now be explained with reference to FIG. 4A which is a flowchart for a method of routing a data request from the PSAP system 28.

In one embodiment, the routing routine 200 is written in C++ and Java programming languages. In step 210, the processor 100 receives a data request message through the COM1 interface, switch 102 and bus 108, or COM4 interface and bus 108. The received data request message is then stored in the memory 104. The data request message typically contains the telephone number of the calling party. In step 212, the processor 100 extracts the calling party's telephone number from the stored data request message.

In decision 213, the processor 100 determines whether the primary database system 34 is unable to provide the data requested by the PSAP system. This is done by determining whether the data request was received through the COM4 interface. If the decision is YES, the processor 100 determines that the primary database system 34 is unable to provide the requested data and control passes to step 350 in FIG. 4C as will be explained later with reference to that figure. If the decision is NO, however, the data request was received through the COM1 interface and control passes to step 214.

In step 214, the processor 100 formulates a data request message containing the extracted calling party number and transmits the formulated message to the alternate information source 52 through the I/O interface 110. In this embodiment, the data request message is transmitted to the alternate information source 52 without determining whether the primary database system 34 is able to provide the requested data in order to save time in retrieving the proper information. In step 216, the data request message from the PSAP system 28 is transmitted to the primary database system 34 without any change to the format of the data request message. In one embodiment, the processor transmits the data request message stored in the memory 104 to the primary database system 34 through the I/O interface COM2. In another embodiment, the processor transmits the data request message from the I/O interface COM1 to the primary database system 34 through the switch 102 by connecting the receive side of the I/O interface COM1 to the transmit side of the I/O interface COM2. In step 218, reply messages from the primary 34 and alternate information sources 52 are received and stored in the memory 104. The step 218 will be explained in greater detail later with reference to FIG. 4B.

In decision 220, the processor 100 determines whether the primary database system 34 is able to provide the data requested by the PSAP system. This is done by determining whether the received reply message from the primary database system 34 contains the requested data such as an address information. If the decision is YES, control passes to step 222. In step 222, the processor 100 transmits the reply message received from the primary database system 34 to the ANI controller 32 through the I/O interface COM1 without any change. It is to be noted that in this embodiment, a reply message from the primary database system 34 takes precedence over a reply message from the alternate information source 52. Thus, when the reply message from the primary database system 34 contains the requested data, the processor 100 transmits the received data to the ANI controller 32 without examining the reply message from the alternate information source 52 (steps 224–228).

If decision 220 is NO, the received reply message from the primary database system 34 indicates that no data is found and control passes to decision 224. In decision 224, the processor determines whether the reply message received from the alternate information source 52 contains the address information. If the decision is NO, control passes to step 222 where the received reply message indicating that no record is found is transmitted to the ANI controller 32 through the I/O interface COM1. If decision 224 is YES, control passes to step 226 where the processor 100 formulates a reply message in the format required by the PSAP system 28 using the information contained in the reply message from the alternate information source 52. In step 228, the processor 100 transmits the formulated reply message to the ANI controller 32 through the I/O interface COM1. The data request routing routine 200 ends at step 230.

Figure 4B:
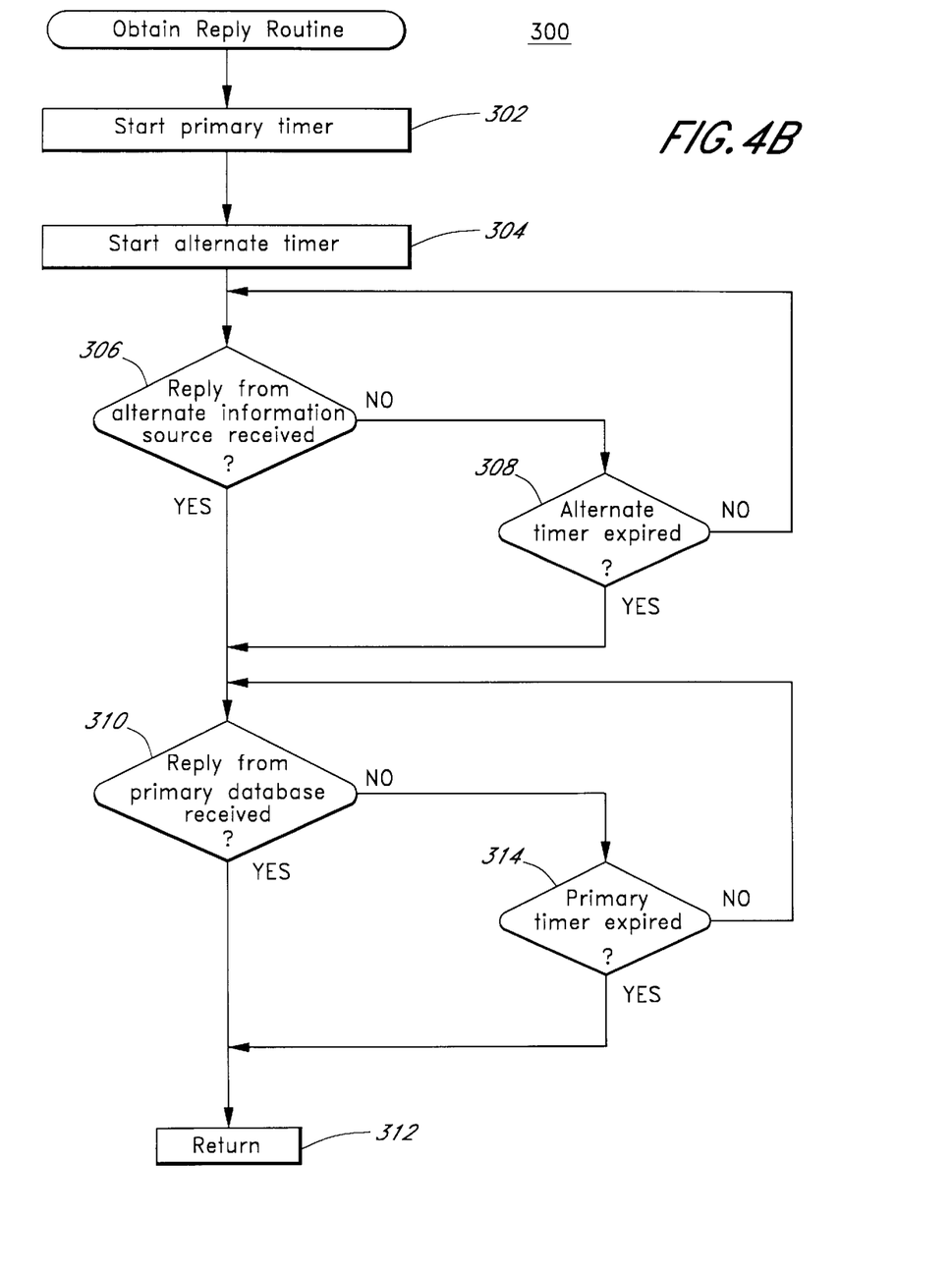
FIG. 4B is a flowchart for a method of obtaining reply messages from a primary database system and an alternate information source according to the present invention.

FIG. 4B is a detailed flowchart of a obtain reply routine 300 (step 218 of FIG. 4) where reply messages from the primary database system 34 and alternate information source 52 are received. In step 302, the processor 100 starts a primary timer to ensure that the primary database system 34 responds with a reply message within a predetermined time period. In step 304, the processor 100 also starts an alternate timer to ensure that the alternate information source 52 responds with a reply message within a predetermined time period. In one embodiment, the predetermined time period for the primary and alternate timers is one second. The primary and alternate timers may be implemented in hardware using a timer or clock circuit (not shown) connected to the control and data bus 108 or they may be implemented in software.

In decision 306, the processor 100 determines whether a reply message from the alternate information source 52 has been received. If decision 306 is YES, control passes to decision 310. If the decision is NO, however, control passes to decision 308. In decision 308, the processor 100 determines whether the alternate timer has expired. If the decision is NO, control passes to decision 306 where receipt of the reply message from the alternate information source 52 is checked again. If decision 308 is YES, control passes to decision 310.

In decision 310, the processor 100 determines whether a reply message from the primary database system 34 has been received. If the decision is YES, control passes to step 312 where the obtain reply routine 300 returns to the data request routing routine 200 and control passes to decision 220. If decision 310 is NO, control passes to decision 314. In decision 314, the processor 100 determines whether the primary timer has expired. If the decision is NO, control passes to decision 310 where receipt of the reply message from the primary database system 34 is checked again. If the decision is YES, however, control passes to step 312 where the obtain reply routine 300 returns to the data request routing routine 200 and control passes to decision 220.

Figure 4C:
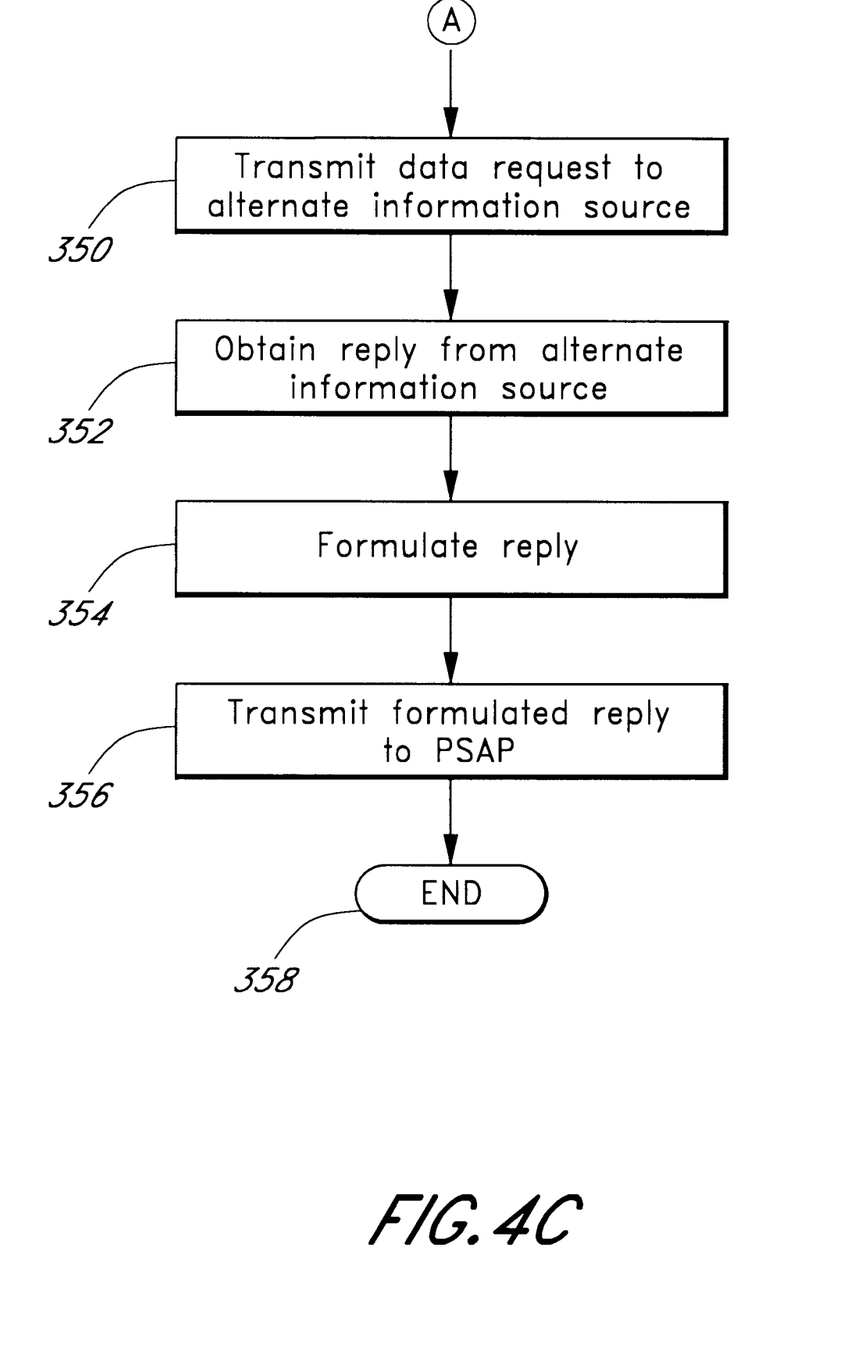
FIG. 4C is a flowchart for an alternative method of routing a data request from the PSAP system according to the present invention.

Referring back to FIG. 4A, in decision 213 control passes to step 350 in FIG. 4C when the processor 100 determines that the primary database system 34 is unable to provide the data requested by the PSAP system. Referring now to FIG. 4C, in step 350, the processor 100 formulates a data request message containing the extracted calling party number and transmits the formulated message to the alternate information source 52 through the I/O interface 110. In this embodiment, transmission of the data request message to the primary database system 34 is not necessary because the processor 100 has already determined that the primary database system is unable to provide the data.

In step 352, a reply message from the alternate information source 52 is received and stored in the memory 104. The step 352 may be implemented using the steps 304–308 of FIG. 4B. In step 354, the processor 100 formulates a reply message in the format required by the PSAP system 28 using the information contained in the reply message from the alternate information source 52. If the reply message from the alternate information source 52 indicates that there is no associated information or the alternate information source 52 does not respond within the predetermined time period, the processor formulates a reply message indicating that no record is found. In step 356, the processor 100 transmits the formulated reply message to the ANI controller 32 through the I/O interface COM4. The data request routing routine 400 ends at step 358.

Figure 5:
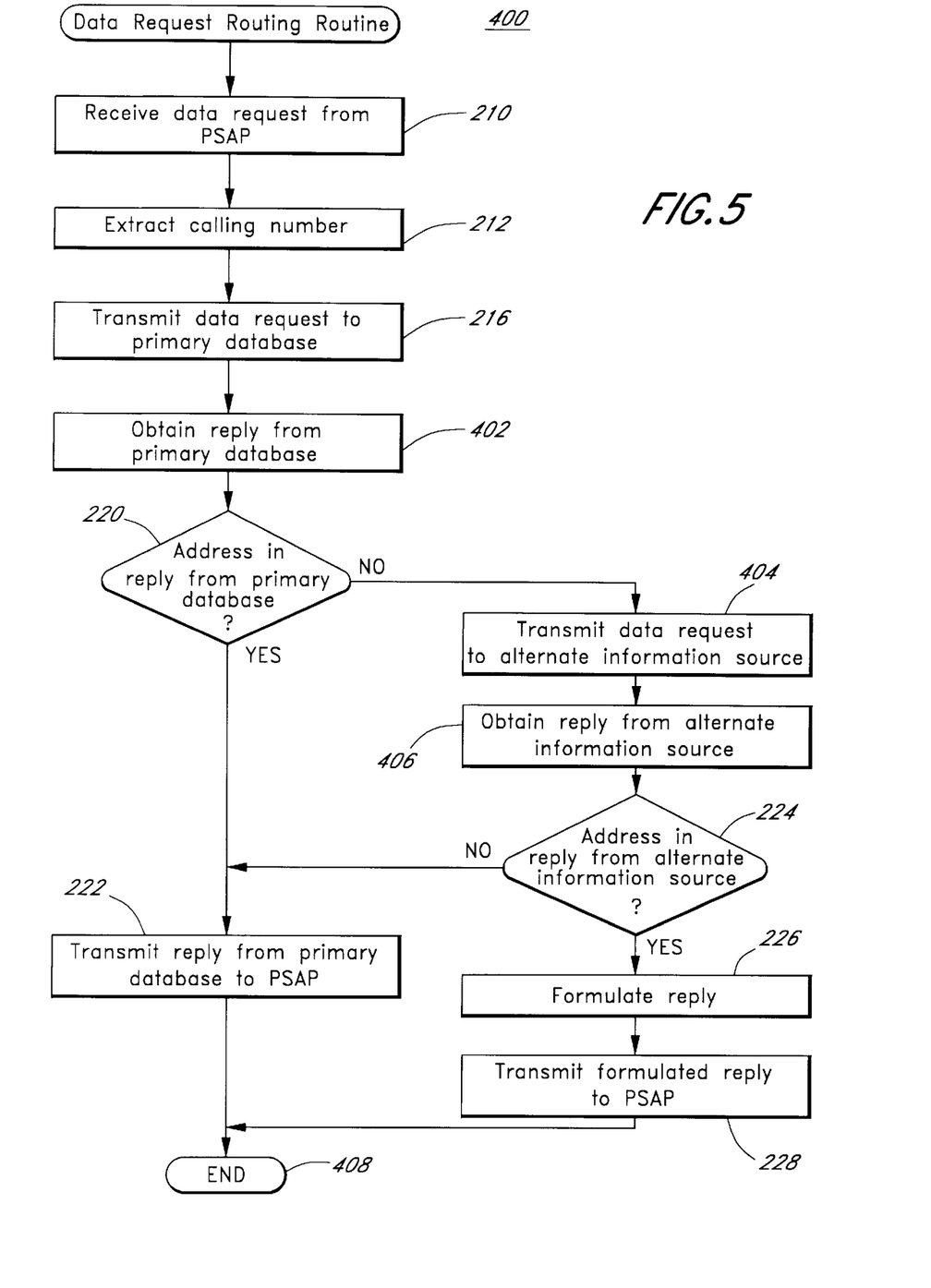
FIG. 5 is a flowchart for another alternative method of routing a data request from the PSAP system according to the present invention.

FIG. 5 is a flowchart of an alternative method of routing a data request from the PSAP system according to the present invention. While the data request routing routine 200 of FIG. 4A transmits the received data request messages to both the primary database system 34 and alternate information source 52 at approximately the same time (steps 214 and 216) without determining whether the primary database system 34 is able to provide the requested data, the routing routine 400 waits until the determination is made by the processor 100. If it determines that the primary database system 34 is unable to provide the requested data, the processor 100 transmits the data request message to the alternate information source 52.

In step 210, the processor 100 receives a data request message through the COM1 interface, switch 102 and bus 108, and is stored in the memory 104. The data request message typically contains the telephone number of the calling party. In step 212, the processor 100 extracts the calling party's telephone number from the stored data request message. In step 216, the data request message from the PSAP system 28 is transmitted to the primary database system 34 without any change to the format of the data request message. In step 402, a reply message from the primary database 34 is received and stored in the memory 104. The step 402 may be implemented using the steps 302, 310–312 of FIG. 5.

In decision 220, the processor 100 determines whether the received reply message from the primary database system 34 contains the requested data such as an address information. If the decision is YES, control passes to step 222. In step 222, the processor 100 transmits the reply message received from the primary database system 34 to the ANI controller 32 through the I/O interface COM1 without any change. If decision 220 is NO, the received reply message indicates that no data is found and control passes to step 404. In step 404, the processor 100 formulates a data request message containing the extracted calling number and transmits the formulated message to the alternate information source 52 through the I/O interface 110.

In step 406, a reply message from the alternate information source 52 is received and stored in the memory 104. The step 406 may be implemented using the steps 304–308 of FIG. 5. In decision 224, the processor determines whether the reply message received from the alternate information source 52 contains the address information. If the decision is NO, control passes to step 222 where the received reply message indicating that no record is found is transmitted to the ANI controller 32 through the I/O interface COM1. If decision 224 is YES, control passes to step 226 where the processor 100 formulates a reply message in the format required by the PSAP system 28 using the information contained in the reply message from the alternate information source 52. In step 228, the processor 100 transmits the formulated reply message to the ANI controller 32 through the I/O interface COM1. The data request routing routine 400 ends at step 408.

In yet another alternative embodiment of the data request routing routine, the determination of whether the primary database system 34 is able to provide the requested data is made by analyzing the data request message. For example, the I+7 digits contained in the data message may be analyzed to determine whether the emergency call is from a PBX or cellular telephone. If so, the processor 100 determines that the primary database system 34 is unable to provide the requested data and the data request message is transmitted to only the alternate information source 52.

According to the present invention, a system and method for providing data requested by a PSAP system has been described. The present invention provides the advantage of being able to provide the requested data from an alternate information source when a primary database system is unable to provide the requested data. In the preferred embodiment, the present invention also provides the advantage of interfacing with existing PSAP and primary database systems with little or no change to the existing PSAP systems to provide a cost-effective solution for obtaining the emergency call location information.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A data request router for use with a public safety answering point (PSAP) system adapted to supplement the PSAP without substantial modification to provide location information for an emergency telephone call, said data request router comprising:

at least one communications interface adapted to communicate with the PSAP system a primary database system and an alternate information source; and a processor connected to the communications interface operable to intercept a data request from the PSAP system intended to be transmitted to the primary database and to transmit the data request to the primary database system and the alternate information source, the processor operable to transmit to the PSAP system the data received from the alternate information source when the processor determines that the primary database system is unable to provide the data requested by the PSAP system.

2. The data request router according to claim 1, further comprising a switch connected to the communications interface, the switch operable to directly connect the PSAP and the primary database when the processor is rendered inoperative.

3. The data request router according to claim 2 wherein the switch allows the PSAP data request to be transmitted to the primary database without interception.

4. The data request router according to claim 1 wherein the processor determines that the primary database system is unable to provide the data requested by the PSAP system when a reply from the primary database system does not contain the data.

5. The data request router according to claim 1 wherein the data request is transmitted to the alternate information source after the processor determines that the primary database system is unable to provide the data requested by the PSAP system.

6. The data request router according to claim 1 wherein the processor determines whether the primary database system is able to provide the data requested by the PSAP system by analyzing the data request received from the PSAP system.

7. The data request router according to claim 1 wherein the processor determines whether the primary database system is able to provide the data requested by the PSAP system by analyzing the calling telephone number contained in the data request from the PSAP system.

8. The data request router according to claim 1 wherein the communications interface is adapted to intercept a data request for an emergency call from a non-primary local exchange carrier.

9. The data request router according to claim 8 wherein the processor determines that the primary database system is unable to provide the data requested by the PSAP system when a data request is intercepted through the communications interface.

10. The data request router according to claim 1, further comprising a data link connecting the alternate information source to at least one mobile switching center.

11. The data request router according to claim 10 wherein the at least one mobile switching center transmits through the data link location information associated with a telephone making an emergency telephone call through the at least one mobile switching center.

12. The data request router according to claim 1 wherein the communications interface comprises:
    a first I/O interface in communication with the PSAP system;
    a second I/O interface in communication with the primary database system; and
    a third I/O interface in communication with the alternate information source.

13. A data request router for use with a public safety answering point (PSAP) system adapted to supplement the PSAP without substantial modification to provide location information for an emergency telephone call, said data request router comprising:
    at least one communications interface adapted to communicate with the PSAP system, a primary database system, and an alternate information source; and
    a processor connected to the communications interface operable to receive a data request from the PSAP system intended to be transmitted to the primary database and to determine whether the primary database system contains the information requested by the data request, and to transmit the obtained data to the PSAP system, the processor operable to obtain data for the PSAP system from the alternate information source when the processor determines that the primary database system does not contain the data requested.

14. The data request router according to claim 13, further comprising a switch connected to the communications interface, the switch operable to directly connect the PSAP system to the primary database system when the processor is rendered inoperative.

15. The data request router according to claim 14 wherein the switch allows the PSAP data request to be transmitted to the primary database without interception.

16. The data request router according to claim 13 wherein the processor transmits the data request to the primary database system and determines that the primary database system is unable to provide the data requested when a reply from the primary database system responsive to the transmitted data request does not contain the data requested.

17. The data request router according to claim 13 wherein the processor determines whether the primary database system is able to provide the data requested by the PSAP system by analyzing the data request received from the PSAP system.

18. The data request router according to claim 13 wherein the communications interface comprises:
    a first I/O interface in communication with the PSAP system;
    a second I/O interface in communication with the primary database system; and
    a third I/O interface in communication with the alternate information source.

19. The data request router according to claim 13, further comprising a data link connecting the alternate information source to at least one mobile switching center.

20. The data request router according to claim 19 wherein the alternate information source includes a server computer connected to the at least one mobile switching center through the data link.

21. A data request router for use with a public safety answering point (PSAP) system adapted to supplement the PSAP without substantial modification to provide location information for an emergency telephone call, said data request router comprising:
    at least one communications interface adapted to communicate with the PSAP system, a primary database system, and an alternate information source; and
    a processor connected to the communications interface operable to receive a data request from the PSAP system intended to be transmitted to the primary database and to determine whether the primary database system is able to provide the information requested by the data request, and to transmit the obtained data to the PSAP system, the processor operable to obtain data for the PSAP system from the alternate information source when the processor determines that the primary database system is unable to provide the data requested; and
    a data link connecting the alternate information source to at least one mobile switching center.

22. The data request router according to claim 21 wherein the alternate information source includes a server computer connected to the at least one mobile switching center through the data link.

23. A data request router for use with a public safety answering point (PSAP) system adapted to supplement the PSAP without substantial modification to provide location information for an emergency telephone call, said data request router comprising:
    at least one communications interface adapted to communicate with the PSAP system, a primary database system, and an alternate information source; and
    a processor connected to the communications interface operable to intercept a data request from the PSAP system intended to be transmitted to the primary database and to determine whether the primary database system contains the information requested by the data request, and to transmit the data request to the alternate information source to obtain location information and to receive a reply from the alternate information source in response to the transmitted data request and to transmit to the PSAP system the data contained in the reply when the processor determines that the primary database system does not contain the data requested by the PSAP system.

24. The data request router according to claim 23 wherein the communications interface comprises:
    a first I/O interface in communication with the PSAP system;
    a second I/O interface in communication with the primary database system; and
    a third I/O interface in communication with the alternate information source.

25. The data request router according to claim 23, further comprising a switch connected to the communications interface, the switch operable to directly connect the PSAP system to the primary database system when the processor is rendered inoperative.

26. The data request router according to claim 23 wherein the communications interface is adapted to intercept data requests for emergency calls from a non-primary local exchange carrier.

27. The data request router according to claim 26 wherein the processor determines that the primary database system is unable to provide the data requested by the PSAP system when a data request is intercepted through the communications interface.

28. The data request router according to claim 23 wherein the data request is transmitted to the alternate information source before the processor determines that the primary database system is unable to provide the data requested by the PSAP system.

29. A data request router for use with a public safety answering point (PSAP) system adapted to supplement the PSAP without substantial modification to provide location information for an emergency telephone call, said data request router comprising:
 a first I/O interface in communication with the PSAP system;
 a second I/O interface in communication with the primary database system;
 a third I/O interface in communication with the alternate information source; and
 a processor connected to the communications interface operable to intercept a data request from the PSAP system intended to be transmitted to the primary database and to determine whether the primary database system is able to provide the information requested by the data request, and to transmit the data request to the alternate information source to obtain location information and to receive a reply from the alternate information source in response to the transmitted data reguest and to transmit to the PSAP system the data contained in the reply at least when the processor determines that the primary database system is unable to provide the data requested by the PSAP system.

30. The data request router according to claim 29, further comprising a switch connected to the communications interfaces, the switch operable to directly connect the PSAP system to the primary database system when the processor is rendered inoperative.

31. The data request router according to claim 29 wherein the communications interfaces is adapted to intercept data requests for emergency calls from a nonprimary local exchange carrier.

32. The data request router according to claim 31 wherein the processor determines that the primary database system is unable to provide the data requested by the PSAP system when a data request is intercepted through the communications interface.

33. The data request router according to claim 29 wherein the data request is transmitted to the alternate information source before the processor determines that the primary database system is unable to provide the data requested by the PSAP system.

34. The data request router according to claim 30 wherein the switch allows the PSAP data request to be transmitted to the primary database without interception.

35. An emergency call service system for upgrading the functionality of a PSAP system and a primary database system to provide supplemental location information for an emergency telephone call, the service system comprising:
 a public safety answering point (PSAP) system connected to the primary database system;
 an alternate information source not originally accessible by the PSAP; and
 a data request router connected to the PSAP system, primary database system and alternate information source, the data request router including:
  a communications interface adapted to communicate with the PSAP system
  the primary database system
  and the alternate information source; and
  a processor connected to the communications interface operable to intercept a data request from the PSAP system intended to be transmitted to the primary database and to determine whether the primary database system is able to provide the information requested by the data request, and to transmit the obtained data to the PSAP system, the processor operable to obtain data for the PSAP system from the alternate information source when the processor determines that the primary database system is unable to provide the data requested.

36. The service system of claim 35 wherein the PSAP system processes emergency wireless telephone calls and emergency wired telephone calls.

37. The service system of claim 35 wherein the alternate information source contains location information corresponding to wireless telephone calls.

38. A method of using data request router to supplement a standard public safety answering point (PSAP) to provide location information for an emergency telephone call without modifying the PSAP itself, the method comprising the steps of:
 intercepting a data request from the PSAP intended to be transmitted to a primary database;
 determining whether the primary database contains the information requested by the data request;
 transmitting the data request to an alternate information source external of the PSAP other than the primary database;
 receiving a reply message from the alternate information source responsive to the data request transmitted thereto;
 determining whether the reply message contains data responsive to the data request by the PSAP; and
 transmitting the data contained in the reply message to the PSAP if it is determined that the reply message contains the data responsive to the request by the PSAP.

39. A method of using a data request router to supplement a public safety answering point (PSAP) system to provide location information for an emergency telephone call, the method comprising the steps of:
 receiving a data request message from the PSAP system intended to be transmitted to a primary database system;
 transmitting the data request message to an alternate information source other than the primary database system;
 receiving a reply message from the alternate information source responsive to the transmitted data request message;
 determining whether the primary database system contains the data requested by the PSAP system;
 determining from the reply message whether the alternate information source contains the data requested by the PSAP system; and
 transmitting the data from the alternate information source to the PSAP system if it is determined that the primary database system does not contain the data requested by the PSAP system and that the alternate information source contains the data requested by the PSAP system.

40. The method according to claim 39 wherein the step of determining whether a primary database system contains the data comprises the steps of:

transmitting the data request message to the primary database system;

receiving a reply message from the primary database system; and determining that the primary database system does not contain the data when the reply message from the primary database system indicates that no record is found.

41. The method according to claim 39 wherein the step of transmitting the data request message to an alternate database is performed prior to the step of determining whether the primary database system is unable to provide the data requested by the PSAP system.

42. The method according to claim 39, further comprising the step of connecting a communication link connected to the PSAP system to a communication link connected to the primary database system when a processor performing the steps of determining is rendered inoperative.

43. The method according to claim 39 wherein the step of determining whether a primary database system is able to provide the data comprises analyzing the data request message received from the PSAP system.

44. The method according to claim 39, further comprising the step of transmitting to the PSAP system a reply message indicating that no data is found if it is determined that both the primary database system and alternate information source are unable to provide the data requested by the PSAP system.

45. A method of using a data request router to supplement a public safety answering point (PSAP) system to provide location information for an emergency telephone call, the method comprising the steps of:

intercepting a data request from the PSAP system intended to be transmitted to a primary database system;

transmitting the data request to an alternate information source;

receiving a reply from the alternate information source responsive to the transmitted data request;

determining whether the primary database system contains the data requested by the PSAP system; and transmitting the data contained in the reply from the alternate information source to the PSAP system if it is determined that the primary database system does not contain the data requested by the PSAP system.

46. The method according to claim 45 wherein the step of determining comprises the steps of:

transmitting the data request to the primary database system;

receiving a reply from the primary database system; and determining that the primary database system is able to provide the data when the reply from the primary database system contains the data requested by the PSAP system.

47. The method according to claim 45 wherein the step of determining comprises the steps of:

transmitting the data request to the primary database system;

receiving a reply from the primary database system; and determining that the primary database system is unable to provide the data when the reply from the primary database system indicates that no record is found.

48. The method according to claim 45 wherein the step of transmitting the data request to an alternate information source is performed after it is determined that the primary database system is unable to provide the data requested by the PSAP system.

49. The method according to claim 45, further comprising the step of connecting a communication link of the PSAP system to a communication link of the primary database system when a processor performing the step of determining is rendered inoperative.

50. The method according to claim 45 wherein the step of determining comprises analyzing the data request received from the PSAP system.

51. The method according to claim 45 wherein the step of determining comprises the step of analyzing the calling number contained in the data request from the PSAP system.

52. The method according to claim 45, further comprising the steps of:

determining whether the alternate information source is able to provide the data requested by the PSAP system; and transmitting to the PSAP system a reply indicating that no data is found if it is determined that both the primary database system and alternate information source are unable to provide the data requested by the PSAP system.

53. A method of using a data request router to supplement a public safety answering point (PSAP) system to provide location information for an emergency telephone call, the method comprising the steps of:

intercepting a data request message from the PSAP system intended to be transmitted to a primary database system;

determining whether the primary database system contains the data requested by the PSAP system;

obtaining the data requested by the PSAP system from an alternate information source other than the primary database system if it is determined that the primary database system does not contain the data requested by the PSAP system; and transmitting the obtained data from the alternate information source to the PSAP system.

54. The method according to claim 53 wherein the step of determining whether a primary database system is able to provide the data comprises the steps of:

transmitting the data request message to the primary database system;

receiving a reply message from the primary database system; and determining that the primary database system is unable to provide the data when the reply message from the primary database system indicates that no record is found.

55. The method according to claim 53 wherein the step of transmitting the data request message to an alternate database is performed prior to the step of determining whether the primary database system is able to provide the data requested by the PSAP system.

56. The method according to claim 53, further comprising the step of connecting a communication link of the PSAP system to a communication link of the primary database system when a processor performing the steps of determining is rendered inoperative.

57. A method of using a data request router supplement a public safety answering point (PSAP) system to provide location information for an emergency telephone call, the method comprising the steps of:

intercepting, a data request from the PSAP system intended to be transmitted to a primary database system;

transmitting the received data request to the primary database system;

transmitting the data request to an alternate information source;

receiving a reply from the primary database system;

receiving a reply from the alternate information source;

determining whether the received reply from the primary database system contains the data requested by the PSAP system;

transmitting to the PSAP system the data contained in the reply from the primary database system when the reply from the primary database system contains the data requested by the PSAP system;

determining whether the received reply from the alternate information source contains the data requested by the PSAP system; and     transmitting to the PSAP system the data contained in the reply from the alternate information source when the reply from the primary database system does not contain the data requested by the PSAP system.

58. A method of using a data request router to supplement a standard public safety answering point (PSAP) to provide location information for an emergency telephone call without modifying the PSAP itself, the method comprising the steps of:

intercepting a data request message from the PSAP intended to be transmitted to a primary database;

determining whether the primary database contains information responsive to the data request; and     transmitting the data request message to an alternate information source external of the PSAP other than the primary database if it is determined that the primary database system does not contain the data requested the PSAP system.

\* \* \* \* \*